US012772146B2

(12) United States Patent
Li

(10) Patent No.: US 12,772,146 B2
(45) Date of Patent: Oct. 20, 2026

(54) METHODS AND APPARATUSES FOR SENDING AND DETERMINING TRACKING AREA CODE, DEVICE AND STORAGE MEDIUM

(71) Applicant: BEIJING XIAOMI MOBILE SOFTWARE CO., LTD., Beijing (CN)

(72) Inventor: Xiaolong Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 315 days.

(21) Appl. No.: 18/281,547

(22) PCT Filed: Mar. 11, 2021

(86) PCT No.: PCT/CN2021/080294
§ 371 (c)(1),
(2) Date: Sep. 11, 2023

(87) PCT Pub. No.: WO2022/188108
PCT Pub. Date: Sep. 15, 2022

(65) Prior Publication Data
US 2024/0306074 A1 Sep. 12, 2024

(51) Int. Cl.
*H04W 48/08* (2009.01)

(52) U.S. Cl.
CPC .................................. *H04W 48/08* (2013.01)

(58) Field of Classification Search
CPC ............................... H04W 88/04; Y02D 30/70
USPC ....................................................... 455/422.1
See application file for complete search history.

(56) References Cited

U.S. PATENT DOCUMENTS

| | | | | |
|---|---|---|---|---|
| 2014/0256321 | A1* | 9/2014 | Aghili | H04W 60/00 455/435.1 |
| 2018/0097590 | A1* | 4/2018 | Ly | H04L 5/0023 |
| 2021/0212014 | A1 | 7/2021 | Gao et al. | |
| 2022/0078746 | A1* | 3/2022 | Lee | H04W 64/003 |
| 2024/0259129 | A1* | 8/2024 | Liu | H04J 11/0069 |

FOREIGN PATENT DOCUMENTS

| | | | |
|---|---|---|---|
| CN | 109996224 | A | 7/2019 |
| CN | 111356163 | A | 6/2020 |
| WO | 2020034324 | A1 | 2/2020 |
| WO | 2020194257 | A1 | 10/2020 |
| WO | 2020197271 | A1 | 10/2020 |
| WO | 2020200010 | A1 | 10/2020 |

OTHER PUBLICATIONS

International Search Report of PCT/CN2021/080294 dated Nov. 30, 2021 with English translation, (6p).

(Continued)

*Primary Examiner* — Fabricio R Murillo Garcia
(74) *Attorney, Agent, or Firm* — Arch & Lake LLP; Hao Tan; Shen Wang

(57) ABSTRACT

The present disclosure provides methods and apparatuses for sending and determining a tracking area code (TAC), a device and a storage medium. The method for sending a TAC, applied to a base station device, including: sending indication information of the TAC, the indication information being used for indicating the range of application of at least one TAC.

17 Claims, 9 Drawing Sheets

(56) References Cited

OTHER PUBLICATIONS

Panasonic, "Fixed Tracking Area and the Tracking Area Code in NTN ", 3GPP TSG-RAN WG2 Meeting#113-e R2-2100820 (Revision of R2-2009120) Online, Jan. 25-Feb. 5, 2021, (3p).
CMCC, "Summary of email discussion [AT113-e][104][NTN] TAC update (CMCC)", 3GPP TSG-RAN WG2 Meeting #113-e R2-2102014 Electronic, Jan 25-Feb. 5, 2021, (22p).
Ericsson (Email discussion rapporteur), "[AT112-e][104][NTN] Misc CP issues (Ericsson)", 3GPP TSG-RAN WG2 Meeting #112-e Tdoc R2-2010765, (19p).
Fraunhofer IIS, Fraunhofer HHI, "NR-NTN: Tracking Area Management", 3GPP TSG-RAN WG3 Meeting #103 Athens, Greece, Feb. 25-Mar. 1, 2019, R3-190178, (15p).
CMCC, "Considerations on Soft TAI Update", 3GPP TSG-RAN WG2 Meeting #113 electronic Online: Jan. 25-Feb. 5, 2021, R2-2101607, (3p).
The First CNOA Issued in Application No. 202180000723.X, dated Jun. 1, 2023, (11p).
Hughes, "NR-NTN: Paging in NGSO Satellite Systems", 3GPP TSG-RAN WG3 Meeting #101, R3-184403, Gothenburg, Sweden Aug. 20-24, 2018, (6p).

* cited by examiner

METHODS AND APPARATUSES FOR SENDING AND DETERMINING TRACKING AREA CODE, DEVICE AND STORAGE MEDIUM

CROSS REFERENCE

The present application is the U.S. National Stage of International Application No. PCT/CN2021/080294, filed on Mar. 11, 2021, the contents of which are incorporated herein by reference in their entireties for all purposes.

TECHNICAL FIELD

The present disclosure relates to the technical field of wireless communication, and in particular to a method and an apparatus for sending and determining tracking area codes (TAC), a device and a storage medium.

BACKGROUND

In 5G New Radio (NR) technology, the base station (gNB) will broadcast the tracking area codes (TAC) to the user equipment (UE). When the user is in anywhere within the coverage range of the base station, users all use the same TAC.

SUMMARY

In view of this, the present disclosure provides a method and an apparatus for sending and determining tracking area codes, a device and a storage medium.

According to the first aspect of the embodiments of the present disclosure, there is provided a method for sending tracking area codes, applied to a base station device, including:

sending indication information of the tracking area codes, wherein the indication information is used to indicate a range of application of at least one tracking area code.

According to the second aspect of the embodiments of the present disclosure, there is provided a method for determining tracking area codes, applied to a user device, including:

- receiving the tracking area codes from a base station device;
- determining a range of application of the tracking area codes; and
- determining a tracking area code corresponding to the user device based on the tracking area codes, the range of application of the tracking area codes, and location information of the user device.

According to the third aspect of the embodiments of the present disclosure, there is provided an apparatus for sending tracking area codes, applied to base station device, including:

- a sending module configured to send indication information of the tracking area codes, wherein the indication information is used to indicate a range of application of at least one tracking area code.

According to the fourth aspect of the embodiments of the present disclosure, there is provided an apparatus for determining tracking area codes, applied to a user device, including:

- a receiving module configured to receive tracking area codes from a base station device;
- a first determining module configured to determine a range of application of the tracking area codes; and
- a second determining module configured to determine a tracking area code corresponding to the user device based on the tracking area codes, the range of application of the tracking area codes, and location information of the user device.

According to the fifth aspect of the embodiments of the present disclosure, there is provided a network side device, including:

- a processor; and
- a memory for storing instructions executable by the processor;
- wherein, the processor is configured to execute the executable instructions in the memory, to implement steps of methods for sending tracking area codes.

According to the sixth aspect of the embodiments of the present disclosure, there is provided a mobile terminal, including:

- a processor; and
- a memory for storing instructions executable by the processor;
- wherein, the processor is configured to execute the executable instructions in the memory, to implement steps of methods for determining tracking area codes.

According to the seventh aspect of the embodiments of the present disclosure, there is provided a non-transitory computer-readable storage medium, having executable instructions stored thereon, wherein the executable instructions implement steps of methods for sending tracking area codes or methods for determining tracking area codes, when executed by a processor.

It should be understood that the above general description and the following detailed description are only exemplary and explanatory and do not limit the present disclosure.

BRIEF DESCRIPTION OF THE DRAWINGS

The drawings described here are used to provide a further understanding of the embodiments of the present disclosure, and constitute a part of the application. The schematic embodiments of the embodiments of the present disclosure and their descriptions are used to explain the embodiments of the present disclosure, and do not constitute undue limitation to the embodiments of the present disclosure. In the drawings.

The accompanying drawings, which are incorporated in and constitute a part of this specification, illustrate embodiments consistent with the embodiments of the disclosure, and serve to explain the principles of the embodiments of the disclosure together with the description.

DETAILED DESCRIPTION

Figure 1:
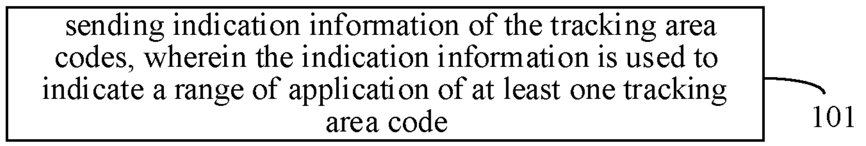
FIG. 1 is a flow chart showing a method for sending tracking area codes according to an example embodiment.

Embodiments of the present disclosure will now be further described in conjunction with the accompanying drawings and specific implementation manners.

Example embodiments will be described herein in detail, examples of which are represented in the accompanying drawings. Where the following description relates to the accompanying drawings, the same numerals in the different accompanying drawings indicate the same or similar elements, unless otherwise indicated. The implementations described in the following example embodiments do not represent all implementations consistent with embodiments of the present disclosure. Rather, they are only examples of apparatuses and methods that are consistent with some aspects of embodiments of the present disclosure as detailed in the appended claims.

It should be noted that an embodiment of the present disclosure may include multiple steps. For the convenience of description, these steps are numbered. However, these numbers do not limit the execution time slots and execution orders between the steps. These steps can be implemented in any order, which is not limited by the embodiments of the present disclosure.

In 5G NR, the registration area (RA) is a collection of tracking areas (TA), and each TA includes one or more cells, corresponding to a certain geographical area. Each TA is determined by a tracking area identification (TAI). The TAI includes a public land mobile network (PLMN) and a tracking area code (TAC). The network side sends the PLMN and TAC to the UE by broadcasting a system message. The network side configures a plurality of TAs, i.e., a TAI list, for the UE. The TAI list includes a plurality of TAs configured for the UE by the network side.

When the UE moves from TA1 (i.e., tracking area 1) to TA2 (i.e., tracking area 2), if TA2 is not in the TAI list configured for the UE by the network side, the UE needs to initiate TAU/RAU, so that the network side can configure a new TAI list for the UE, to ensure that the network side can track the UE. The coverage range of the NTN cell is relatively large, at borders of different countries, the NTN cell may cover a plurality of different countries, and the borders between countries are mostly irregular. For example, when the satellite moves to a location covering area 3, the TAC broadcast by it is TAC3, then even if area 3 involves different countries, the TACs acquired by UEs in different countries are all TAC3. For UEs in different countries, the network side may adopt different access strategies. For example, the gNB needs to select different core networks to access for UEs in different countries. However, the network side cannot distinguish the country where each UE is located through the corresponding TAC reported by the UEs.

The method for sending tracking area codes and the method for determining tracking area codes provided by the embodiments of the present disclosure are particularly applicable to the NTN network where the above situation exists, and also applicable to the TN network.

An embodiment of the present disclosure provides a method for sending tracking area codes, and the method is applied to a base station device. FIG. 1 is a flow chart of a method for sending tracking area codes according to an example embodiment. As shown in FIG. 1, the method includes:

step 101: sending indication information of the tracking area codes, wherein the indication information is used to indicate a range of application of at least one tracking area code.

In an embodiment, the base station device sends the indication information of the TAC, for example, when broadcasting the TAC. Here, the indication information of the TAC is used to indicate the range of application of at least one TAC among the TACs sent by the base station device. Here, the range of application of the TAC corresponds to a part or all of the coverage range of the cell. The coverage range of the cell may be the cell coverage range corresponding to the base station device broadcasting the TAC.

In an embodiment, the base station broadcasts one TAC and sends indication information, where the indication information is used to indicate the range of application of the one TAC. In an embodiment, the base station broadcasts a plurality of TACs, and sends indication information, where the indication information is used to indicate the range of application of some TACs in the plurality of TACs. In an embodiment, the base station broadcasts N TACs and sends indication information, where the indication information is used to indicate the range of application of N−1 TACs, where N is a positive integer greater than or equal to 2. In an embodiment, the base station device broadcasts a plurality of TACs, and sends indication information to the user device, where the indication information includes information indicating the range of application of all TACs, for example, information about geographic location coordinates of all TACs.

In this implementation, the base station device sends indication information of the tracking area codes, the indication information is used to indicate a range of application of at least one tracking area code, so that the range of application of the tracking area codes sent by the base station device is smaller than a coverage range of a cell, so that the user device can determine the TAC corresponding to the user device based on the indication information after receiving the indication information, which achieves that user devices in the same cell coverage range can use different TACs.

An embodiment of the present disclosure provides a method for sending tracking area codes, and the method is applied to a base station device. The method includes: sending indication information of the tracking area codes, wherein the indication information is used to indicate a range of application of at least one tracking area code, and the range of application of the tracking area codes is smaller than or equal to a coverage range of a cell.

In an embodiment, the base station device broadcasts one TAC and sends indication information, where the indication information is used to indicate the range of application of the one TAC, and the range of application of the one TAC is the coverage range of the entire cell. In an embodiment, the base station device broadcasts a plurality of TACs, and sends indication information, where the indication information is used to indicate the range of application of some TACs in the plurality of TACs, where the range of application of each TAC is smaller than the coverage range of the cell. In an embodiment, the base station device broadcasts a plurality of TACs, and sends indication information to the user device, where the indication information includes information indicating the range of application of all TACs, for example, information about geographic location coordinates of all TACs.

In an embodiment, the cell is a cell in the NTN network. When the coverage range of the cell is relatively large, the range of application of the TAC may also be relatively large. Due to the large coverage range of the NTN cell, if the range of application of the TAC is relatively large, UEs belonging to different countries may correspond to the same TAC, which makes it difficult for the network side to distinguish the country where each UE is located through the corresponding TAC reported by the UE. However, since the range of application of the TAC is smaller than the coverage range of the cell, that is, the range of application of the TAC is set small, the above-mentioned problems caused by UEs belonging to different countries corresponding to the same TAC can be avoided.

Figure 2:
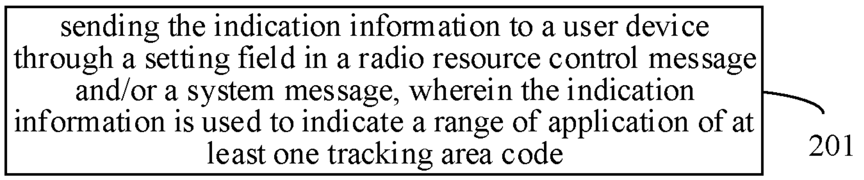
FIG. 2 is a flow chart showing a method for sending tracking area codes according to an example embodiment.

An embodiment of the present disclosure provides a method for sending tracking area codes, and the method is applied to a base station device. The method may be executed independently, or may be executed in combination with any other embodiment of the embodiments of the present disclosure. FIG. 2 is a flow chart of a method for sending tracking area codes according to an example embodiment. As shown in FIG. 2, the method includes:

step 201: sending the indication information to a user device through a setting field in a radio resource control message and/or a system message, wherein the indication information is used to indicate a range of application of at least one tracking area code.

In an embodiment, the base station device sends the indication information used to indicate a range of application of at least one tracking area code to a user device through a setting field in a radio resource control message and/or a system message. The number of bits in the setting field can be set as required, for example, 1 bit, 2 bits or more, which is not limited here.

In an embodiment, the base station device sends the indication information used to indicate a range of application of at least one tracking area code to a user device through a setting field in a system message. In an embodiment, the base station device sends the indication information used to indicate a range of application of at least one tracking area code to a user device through a setting field in a radio resource control message. In an embodiment, the base station device sends the indication information used to indicate a range of application of at least one tracking area code to a user device through a setting field in a radio resource control message and a system message. That is, the base station device sets a setting field in a radio resource control message and a system message, and sends the system message and the radio resource control message.

In an embodiment, the range of application of the tracking area codes is smaller than or equal to a coverage range of a cell.

The base station device notifies the user device of the specific location where the indication information exists in the system message and/or the radio resource control message, i.e., the location of the setting field. The location of the setting field can also be specified in the standard. The user device can obtain the above indication information by receiving the system message and/or the radio resource control message sent by the base station device, and obtaining the content of the setting field in the system message and/or the radio resource control message. Therefore, the user device can determine its corresponding TAC through the indication information.

An embodiment of the present disclosure provides a method for sending tracking area codes, and the method is applied to a base station device. The method may be executed independently, or may be executed in combination with any other embodiment of the embodiments of the present disclosure. The method includes: sending indication information of the tracking area codes, wherein the indication information is used to indicate a range of application of at least one tracking area code, and the indication information includes: information used for indicating that the range of application of the tracking area codes corresponds to the coverage range of the cell.

In an embodiment, the base station device broadcasts one TAC and sends indication information, where the indication information is used to indicate the range of application of the one TAC.

In an embodiment, the base station device broadcasts one TAC: TAC1, the base station device sets the setting field in the system message and/or radio resource control message to "1", and sends the system message and/or radio resource control message to the user device. Here, the setting field "1" indicates that the range of application of the TAC1 corresponds to the coverage range of the entire cell.

In an embodiment, the base station device broadcasts one TAC: TAC1, the base station device sets the setting field in the system message and/or radio resource control message to "0", and sends the system message and/or radio resource control message to the user device. Here, the setting field "0" indicates that the range of application of the TAC1 corresponds to the coverage range of the entire cell.

In an embodiment, the range of application of the tracking area codes is smaller than or equal to a coverage range of a cell.

Through the method in this embodiment, in the case that the base station device only broadcasts one TAC, the base station device can send the TAC and indication information to the user device, and the user device can obtain the range of application of the TAC without requiring to inform the user device the geographic location coordinates of the range of application of the sent TAC, which improves the efficiency of sending information.

An embodiment of the present disclosure provides a method for sending tracking area codes, and the method is applied to a base station device. The method may be executed independently, or may be executed in combination with any other embodiment of the embodiments of the present disclosure. The method includes: sending indication information of the tracking area codes, wherein the indication information is used to indicate a range of application of at least one tracking area code, and the indication information is used for indicating that the range of application of the tracking area codes corresponds to a part of the coverage range of the cell, wherein the part of the coverage range of the cell is a coverage range of the cell after removing the range of application of other tracking area codes from the coverage range of the cell.

In an embodiment, the base station device broadcasts three TACs: TAC1, TAC2, and TAC3, and the indication information sent to the user device includes: the geographic location coordinates of the range of application of TAC1 and the geographic location coordinates of the range of application of TAC2, and the setting field of at least 1 bit of the range of application of TAC3. Here, the setting field of at least 1 bit of the range of application of TAC3 is used to indicate that the range of application of TAC3 is a coverage range of the cell after removing the range of application of TAC1 and the range of application of TAC2 from the coverage range of the cell. In the foregoing implementation manner, the range of application of each TAC may be indicated by 1 bit or a plurality of bits, which is not limited in the embodiments of the present disclosure.

In an embodiment, the range of application of the tracking area codes is smaller than or equal to a coverage range of a cell.

Through the method in this embodiment, in a case that the base station device broadcasts a plurality of TACs, when the base station device sends indication information through a system message and/or a radio resource control message, it can send a setting field indicating the range of application of one TAC and the geographic location coordinates of other TACs in the indication information, so that the user device can obtain the range of application of all TACs through the indication information, thereby improving the efficiency of sending information.

An embodiment of the present disclosure provides a method for sending tracking area codes, and the method is applied to a base station device. The method may be executed independently, or may be executed in combination with any other embodiment of the embodiments of the present disclosure. The method includes: sending indication information of the tracking area codes, wherein the indication information is used to indicate a range of application of at least one tracking area code, and the indication information includes information used for indicating geographic location coordinates of the range of application of the tracking area codes.

In an embodiment, the base station device broadcasts one TAC: TAC1, and sends indication information to the user device, where the indication information includes information used for indicating geographic location coordinates of the range of application of TAC1.

In an embodiment, the base station device broadcasts three TACs: TAC1, TAC2, and TAC3, and sends indication information to the user device, where the indication information includes information used for indicating geographic location coordinates of the range of application of each of TAC1, TAC2, and TAC3.

In an embodiment, the range of application of the tracking area codes is smaller than or equal to a coverage range of a cell.

Through the method in this embodiment, when the base station device broadcasts the TAC, it will also send indication information, where the indication information includes information indicating the range of application of all the broadcasted TACs. After receiving the TAC and indication information sent by the base station device, the user device can accurately determine the range of application of each TAC.

An embodiment of the present disclosure provides a method for sending tracking area codes, and the method is applied to a base station device. The method may be executed independently, or may be executed in combination with any other embodiment of the embodiments of the present disclosure. The method includes: sending indication information of the tracking area codes, wherein the indication information is used to indicate a range of application of at least one tracking area code. In response to that no indication information corresponds to the tracking area codes sent by the base station device, the range of application of the tracking area codes corresponds to a part of the coverage range of the cell, wherein the part of the coverage range of the cell is a coverage range of the cell after removing the range of application of other tracking area codes from the coverage range of the cell.

In an embodiment, the base station device broadcasts N tracking area codes and sends indication information, wherein the indication information only includes information for indicating the range of application of N−1 tracking area codes, and N is a positive integer greater than or equal to 2. At this time, the range of application of the remaining one tracking area code corresponds to a part of the coverage range of the cell. The part of the coverage range is a coverage range of the cell after removing the range of application of N−1 tracking area codes with corresponding indication information of the range of application from the coverage range of the cell.

In an embodiment, the base station device broadcasts three TACs: TAC1, TAC2, and TAC3, and sends indication information to the user device: geographic location coordinates of the range of application of TAC1 and TAC2. The indication information sent by the base station device does not include the range of application of TAC3. In this case, the range of application of TAC3 is the coverage range of the cell after removing the range of application of TAC1 and the range of application of TAC2 from the coverage range of the cell.

In an embodiment, the range of application of the tracking area codes is smaller than or equal to a coverage range of a cell.

Through the method in this embodiment, in the case the base station device broadcasts a plurality of TACs, the indication information sent by the base station device does not include information indicating the range of application of one of the TACs. However, the base station device and the user device negotiate that, in the protocol or standard, the range of application of the one TAC in this case is a coverage range of the cell after removing the range of application of other tracking area codes from the coverage range of the cell. In this way, the user device can still obtain the range of application of all TACs broadcast by the base station device, thereby improving the efficiency of sending information.

An embodiment of the present disclosure provides a method for sending tracking area codes, and the method is applied to a base station device. The method may be executed independently, or may be executed in combination with any other embodiment of the embodiments of the present disclosure. The method includes: sending one TAC, without sending indication information of the TAC.

In an embodiment, the base station device sends one TAC, without sending any indication information. The base station device and the user device negotiate that, in the protocol or standard, the range of application of the one TAC in this case is a coverage range of the cell.

Through the method in this embodiment, when the base station device broadcasts one TAC, the user device can acquire the range of application of the one TAC, without requiring to send any indication information, which improves the efficiency of sending information.

Figure 3:
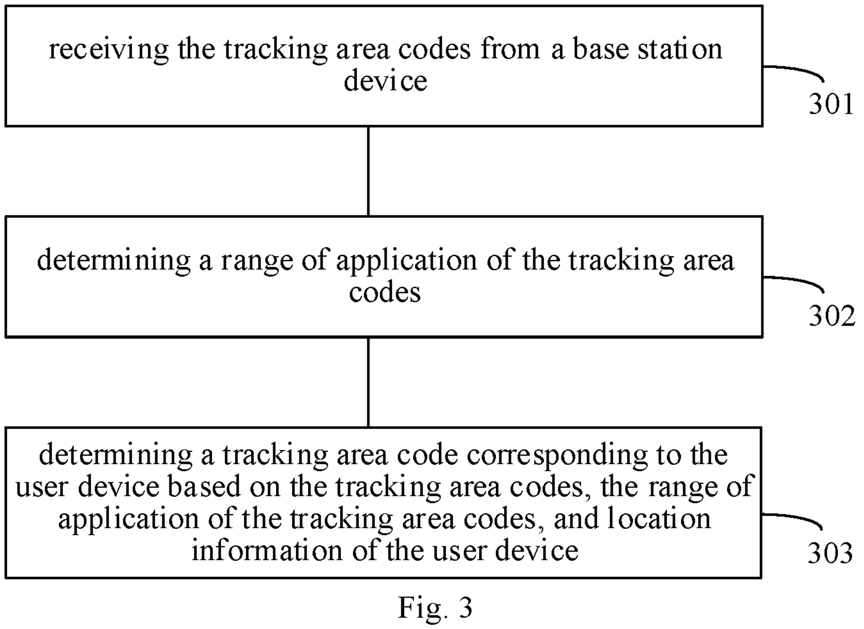
FIG. 3 is a flow chart showing a method for determining tracking area codes according to an example embodiment.

An embodiment of the present disclosure provides a method for determining tracking area codes, and the method is applied to a user device. The method may be executed independently, or may be executed in combination with any other embodiment of the embodiments of the present disclosure. FIG. 3 is a flow chart of a method for determining tracking area codes according to an example embodiment. As shown in FIG. 3, the method includes:

step 301, receiving the tracking area codes from a base station device;

step 302, determining a range of application of the tracking area codes; and step 303, determining a tracking area code corresponding to the user device based on the tracking area codes, the range of application of the tracking area codes, and location information of the user device.

In this embodiment, the user device receives the TAC from the base station device, determines the range of application of each TAC, and determines the corresponding TAC of the user device based on the received TAC, the determined range of application and the location of the user device.

In an embodiment, the user device receives three TACs from the base station: TAC1, TAC2, and TAC3. The user device determines that the range of application of TAC1 is AREA1, the range of application of TAC2 is AREA2, and the range of application of TAC3 is AREA3. The user device obtains its own location information, and determine that the current location of the user device is within the range of AREA1, so that the user device determines that its corresponding TAC is TAC1 corresponding to AREA1.

Through the method in this embodiment, the user device can accurately determine its corresponding TAC, thereby facilitating the network, i.e., the base station device to determine a more accurate location of the UE.

Figure 4:
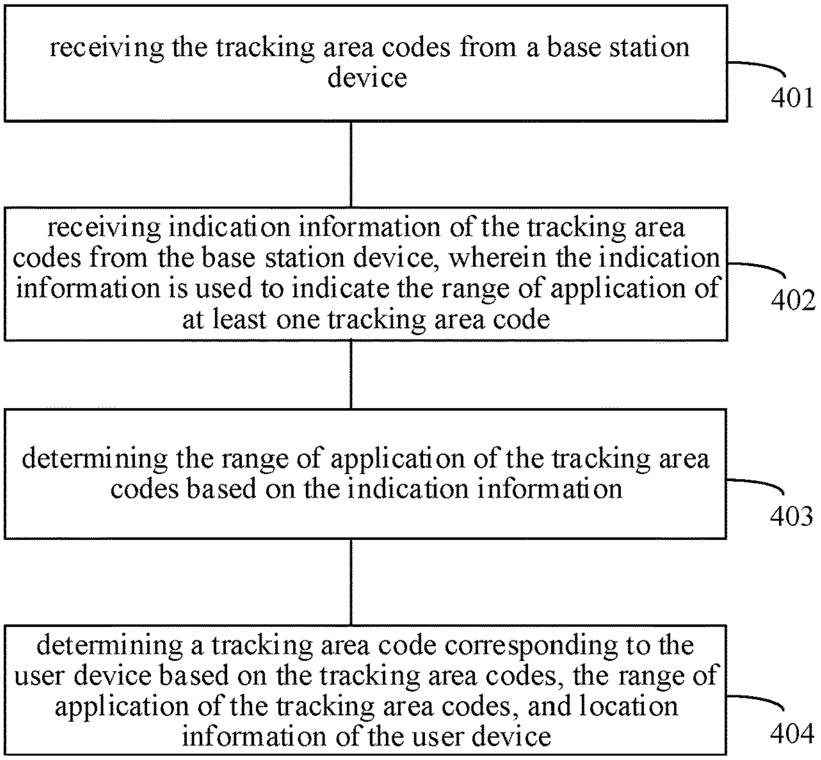
FIG. 4 is a flow chart showing a method for determining tracking area codes according to an example embodiment.

An embodiment of the present disclosure provides a method for determining tracking area codes, and the method is applied to a user device. The method may be executed independently, or may be executed in combination with any other embodiment of the embodiments of the present disclosure. FIG. 4 is a flow chart of a method for determining tracking area codes according to an example embodiment. As shown in FIG. 4, the method includes:

step 401, receiving the tracking area codes from a base station device;

step 402, receiving indication information of the tracking area codes from the base station device, wherein the indication information is used to indicate the range of application of at least one tracking area code;

step 403, determining the range of application of the tracking area codes based on the indication information;

step 404, determining a tracking area code corresponding to the user device based on the tracking area codes, the range of application of the tracking area codes, and location information of the user device.

In this embodiment, the user device not only receives the TAC from the base station device, but also receives indication information for indicating the range of application of at least one TAC from the base station device. The user device determines the range of application of each received TAC based on the indication information received from the base station device, so as to determine the corresponding TAC of the user device based on the received TAC, the determined range of application and the location of the user device.

Through the method in this embodiment, the user device can accurately determine its corresponding TAC through the indication information received from the base station device, thereby facilitating the network, i.e., the base station device to determine a more accurate location of the UE.

Figure 5:
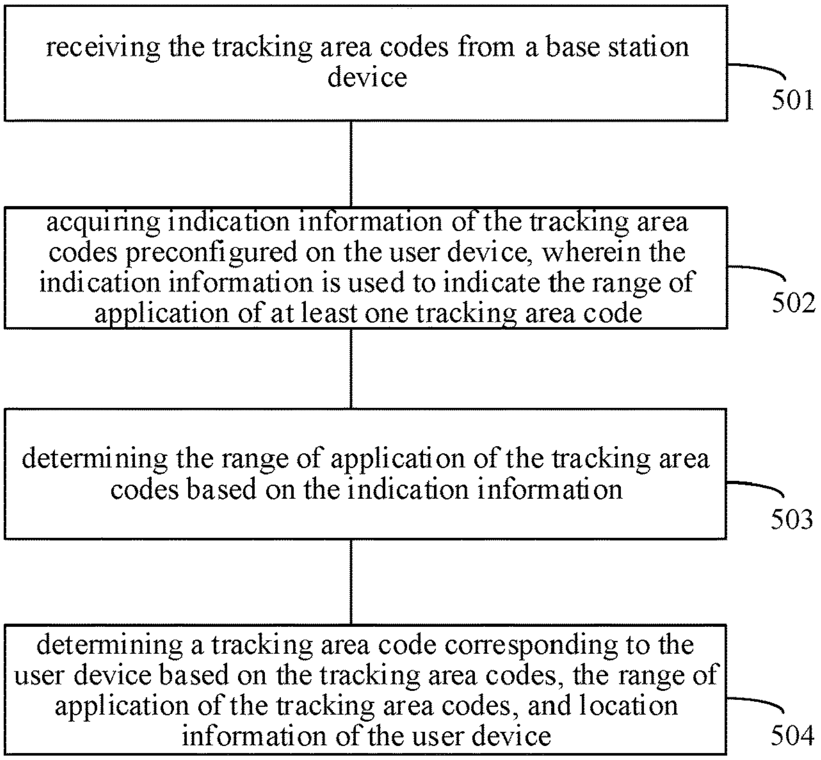
FIG. 5 is a flow chart showing a method for determining tracking area codes according to an example embodiment.

An embodiment of the present disclosure provides a method for determining tracking area codes, and the method is applied to a user device. The method may be executed independently, or may be executed in combination with any other embodiment of the embodiments of the present disclosure. FIG. 5 is a flow chart of a method for determining tracking area codes according to an example embodiment. As shown in FIG. 5, the method includes:

step 501, receiving the tracking area codes from a base station device;

step 502, acquiring indication information of the tracking area codes preconfigured on the user device, wherein the indication information is used to indicate the range of application of at least one tracking area code;

step 503, determining the range of application of the tracking area codes based on the indication information;

step 504, determining a tracking area code corresponding to the user device based on the tracking area codes, the range of application of the tracking area codes, and location information of the user device.

In this embodiment, the user device only receives TACs: TAC1, TAC2, TAC3 from the base station device. The user device obtains indication information preconfigured by itself for indicating the range of application of at least one TAC. The user device determines the range of application of the received TACs based on the preconfigured indication information. The range of application of TAC1 is AREA1, the range of application of TAC2 is AREA2, and the range of application of TAC3 is AREA3. The user device determines that the TAC corresponding to the user device is TAC1 based on the received TAC, the determined range of application, and the location of the user device.

The preconfigured indication information here may be preconfigured in the storage device of the user device, in the Universal Subscriber Identity Module (USIM) for the user device, or in the Embedded Subscriber Identity Module (eSIM) for the user device.

Through the method in this embodiment, the user device accurately determines its corresponding TAC through the indication information preconfigured by itself, which facilitates the network, i.e., the base station device to determine a more accurate location of the UE.

An embodiment of the present disclosure provides a method for determining tracking area codes, and the method is applied to a user device. The method may be executed independently, or may be executed in combination with any other embodiment of the embodiments of the present disclosure. The method includes:

receiving the tracking area codes from a base station device;

determining a range of application of the tracking area codes; and determining a tracking area code corresponding to the user device based on the tracking area codes, the range of application of the tracking area codes, and location information of the user device, wherein the range of application of the tracking area codes is smaller than or equal to a coverage range of a cell.

In an embodiment, the user device receives one TAC, TAC1, from the base station device, determines that the range of application of the one TAC is the coverage range of the entire cell. It is determined that the TAC corresponding to the user device is TAC1 based on the one TAC, the determined range of application and the location of the user device. In this case, the range of application of the TAC is equal to the coverage range of the cell. In an embodiment, the user device receives a plurality of TACs from the base station device, determines the range of application of each TAC, and determines the corresponding TAC of the user device based on the plurality of TACs, the determined range of application, and the location of the user device. The range of application of each TAC is smaller than the coverage range of the cell.

In an embodiment, the cell is a cell in the NTN network. When the coverage range of the cell is relatively large, the range of application of the TAC may also be relatively large. Due to the large coverage range of the NTN cell, if the range of application of the TAC is relatively large, UEs belonging to different countries may correspond to the same TAC, which makes it difficult for the network side to distinguish the country where each UE is located through the corresponding TAC reported by the UE. However, since the range of application of the TAC is smaller than the coverage range of the cell, that is, the range of application of the TAC is set small, the above-mentioned problems caused by UEs belonging to different countries corresponding to the same TAC can be avoided.

Figure 6:
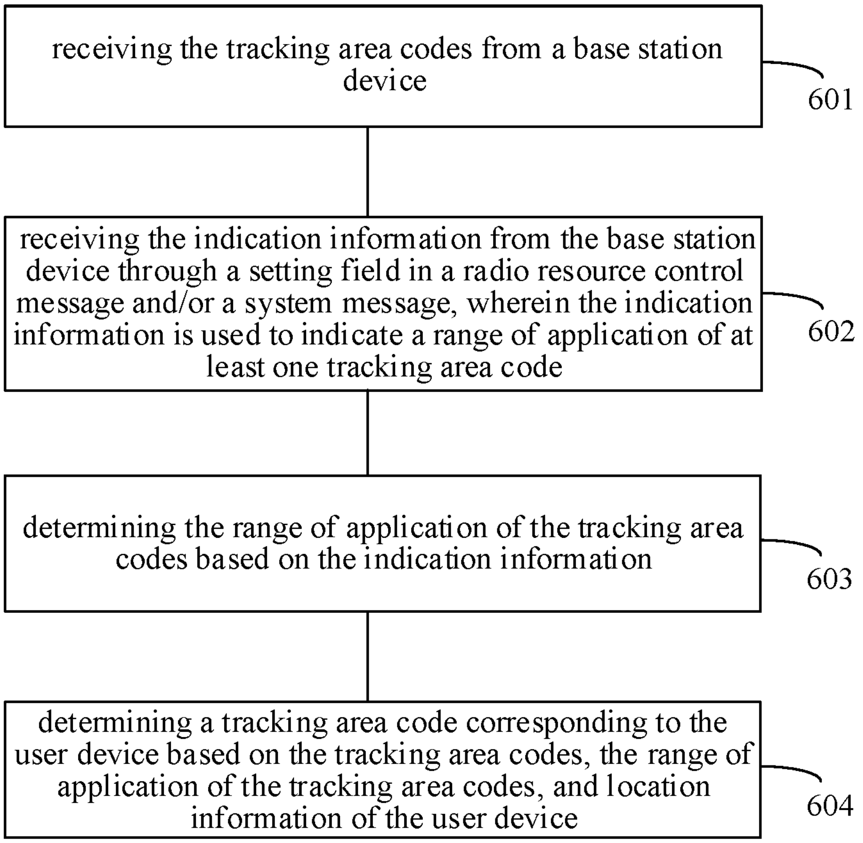
FIG. 6 is a flow chart showing a method for determining tracking area codes according to an example embodiment.

An embodiment of the present disclosure provides a method for determining tracking area codes, and the method is applied to a user device. The method may be executed independently, or may be executed in combination with any other embodiment of the embodiments of the present disclosure. FIG. 6 is a flow chart of a method for determining tracking area codes according to an example embodiment. As shown in FIG. 6, the method includes:

step 601, receiving the tracking area codes from a base station device;

step 602, receiving the indication information from the base station device through a setting field in a radio resource control message and/or a system message, wherein the indication information is used to indicate a range of application of at least one tracking area code;

step 603, determining the range of application of the tracking area codes based on the indication information;

step 604, determining a tracking area code corresponding to the user device based on the tracking area codes, the range of application of the tracking area codes, and location information of the user device.

In this embodiment, the user device obtains the indication information by receiving the system message and/or radio resource control message sent by the base station device, and obtaining the content of the setting field in the system message and/or radio resource control message, so as to determine the range of application of the received TAC, and thus the user device can accurately determine its corresponding TAC, which facilitates the network to determine a more accurate location of the user device.

In an embodiment, the range of application of the tracking area codes is smaller than or equal to a coverage range of a cell.

Figure 7:
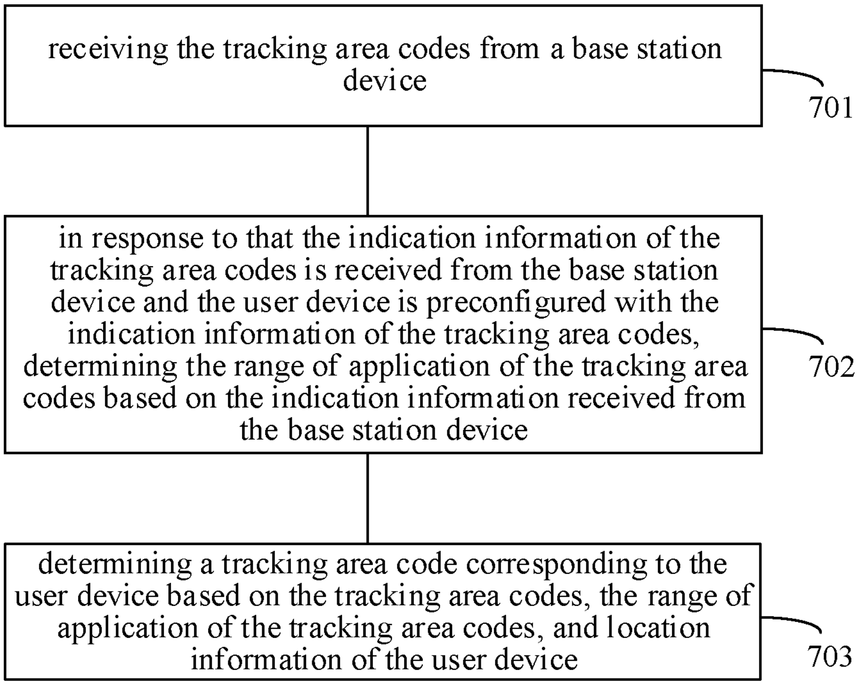
FIG. 7 is a flow chart showing a method for determining tracking area codes according to an example embodiment.

An embodiment of the present disclosure provides a method for determining tracking area codes, and the method is applied to a user device. The method may be executed independently, or may be executed in combination with any other embodiment of the embodiments of the present disclosure. FIG. 7 is a flow chart of a method for determining tracking area codes according to an example embodiment. As shown in FIG. 7, the method includes:

step 701, receiving the tracking area codes from a base station device;

step 702, in response to that the indication information of the tracking area codes is received from the base station device and the user device is preconfigured with the indication information of the tracking area codes, determining the range of application of the tracking area codes based on the indication information received from the base station device;

step 703, determining a tracking area code corresponding to the user device based on the tracking area codes, the range of application of the tracking area codes, and location information of the user device.

In this embodiment, when the user device receives the indication information of the TAC sent by the base station device and the user device is also preconfigured with the indication information of the TAC, the user device determines the range of application of the TAC based on the indication information received from the base station device.

In an embodiment, the range of application of the tracking area codes is smaller than or equal to a coverage range of a cell.

In this embodiment, the indication information of the TAC acquired from the user device is preconfigured on the user device, and the indication information of TAC received from the base station device is received from the base station device when the user device receives the TAC from the base station device. Therefore, the indication information received from the base station device may be more accurate and updated indication information. Based on the indication information received from the base station device, the range of application of the TAC can be determined more accurately, and then the user device can accurately determine its corresponding TAC, which facilitates the network to determine the more precise location of the user device.

An embodiment of the present disclosure provides a method for determining tracking area codes, and the method is applied to a user device. The method may be executed independently, or may be executed in combination with any other embodiment of the embodiments of the present disclosure. The method includes:

receiving the tracking area codes from a base station device;

receiving indication information of the tracking area codes from the base station device, wherein the indication information includes: information used for indicating that the range of application of the tracking area codes corresponds to the coverage range of the cell;

determining the range of application of the tracking area codes based on the indication information;

determining a tracking area code corresponding to the user device based on the tracking area codes, the range of application of the tracking area codes, and location information of the user device.

In an embodiment, the user device receives one TAC, TAC1, from the base station device, receives indication information of TAC1 from the base station device, and determines that the range of application of TAC1 corresponds to the coverage range of the entire cell based on the indication information. Based on the TAC1, the determined range of application and the location of the user device, it is determined that the TAC corresponding to the user device is TAC1.

In an embodiment, the range of application of the tracking area codes is smaller than or equal to a coverage range of a cell.

Through the method in this embodiment, in the case that the base station device only broadcasts one TAC, when the user device receives the one TAC and indication information, it can determine the range of application of the TAC without obtaining the geographic location coordinates of the TAC, which improves the efficiency of receiving information.

An embodiment of the present disclosure provides a method for determining tracking area codes, and the method is applied to a user device. The method may be executed independently, or may be executed in combination with any other embodiment of the embodiments of the present disclosure. The method includes:

receiving the tracking area codes from a base station device;

receiving indication information of the tracking area codes from the base station device, wherein the indication information includes: used for indicating that the range of application of the tracking area codes corresponds to a part of the coverage range of the cell, wherein the part of the coverage range of the cell is a coverage range of the cell after removing the range of application of other tracking area codes from the coverage range of the cell;

determining the range of application of the tracking area codes based on the indication information;

determining a tracking area code corresponding to the user device based on the tracking area codes, the range of application of the tracking area codes, and location information of the user device.

In an embodiment, the user device receives three TACs: TAC1, TAC2, and TAC3 from the base station device, and receives indication information from the base station device: the geographic location coordinates of the range of application of TAC1 and the geographic location coordinates of the range of application of TAC2, and the setting field of 1 bit of the range of application of TAC3. The setting field here is provided with indication information, which is used to indicate that the range of application of TAC3 is a coverage range of the cell after removing the range of application of TAC1 and the range of application of TAC2 from the coverage range of the cell. The user device determines the range of application of the three TACs based on the above indication information, and determines the TAC corresponding to the user device based on the received TAC, the determined range of application and the location of the user device.

In an embodiment, the range of application of the tracking area codes is smaller than or equal to a coverage range of a cell.

Through the method in this embodiment, in the case that the base station device broadcasts a plurality of TACs, the user device can determine the range of application of a certain TAC according to the setting field in the received system message and/or the radio resource control message, the setting field being not the geographic location coordinates, thereby improving the efficiency of receiving information.

An embodiment of the present disclosure provides a method for determining tracking area codes, and the method is applied to a user device. The method may be executed independently, or may be executed in combination with any other embodiment of the embodiments of the present disclosure. The method includes:

receiving the tracking area codes from a base station device;

receiving indication information of the tracking area codes from the base station device, wherein the indication information includes information used for indicating geographic location coordinates of the range of application of the tracking area codes;

determining the range of application of the tracking area codes based on the indication information;

determining a tracking area code corresponding to the user device based on the tracking area codes, the range of application of the tracking area codes, and location information of the user device.

In this embodiment, the user device receives TACs: TAC1, TAC2, TAC3 from the base station device; and receives indication information, the indication information includes: the geographical position coordinates of the range of application of TAC1, the geographical position coordinates of the range of application of TAC2, and the geographical position coordinates of the range of application of TAC3. The user device determines that the range of application of TAC1 is AREA1, the range of application of TAC2 is AREA2, and the range of application of TAC3 is AREA3, based on the indication information. The user device obtains its own location information and determines that the current location of the user device is within the range of AREA1, so that the user device determines that its corresponding TAC is the TAC1 corresponding to AREA1.

Through the method in this embodiment, the user device can accurately determine its corresponding TAC, thereby facilitating the network to determine a more accurate location of the user device.

An embodiment of the present disclosure provides a method for determining tracking area codes, and the method is applied to a user device. The method may be executed independently, or may be executed in combination with any other embodiment of the embodiments of the present disclosure. The method includes:

receiving the tracking area codes from a base station device;

receiving indication information of the tracking area codes from the base station device, wherein the indication information is used to indicate a range of application of at least one tracking area code;

in response to that no indication information corresponds to the tracking area codes received from the base station device, determining that the range of application of the tracking area codes without corresponding indication information corresponds to a part of the coverage range of the cell, wherein the part of the coverage range of the cell is a coverage range of the cell after removing the range of application of other tracking area codes from the coverage range of the cell;

determining a tracking area code corresponding to the user device based on the tracking area codes, the range of application of the tracking area codes, and location information of the user device.

In an embodiment, the user device receives three TACs: TAC1, TAC2, and TAC3 from the base station, and receives indication information, where the indication information includes geographic location coordinates of the range of application of TAC1 and TAC2. The indication information does not include information for indicating the range of application of TAC3. In this case, the range of application of TAC3 is the coverage range of the cell after removing the range of application of TAC1 and the range of application of TAC2 from the coverage range of the cell.

In an embodiment, the range of application of the tracking area codes is smaller than or equal to a coverage range of a cell.

In the case of the above embodiment, the base station device and the user device determine that the range of application of the TAC without corresponding indication information in this case is a coverage range of the cell after removing the range of application of other tracking area codes from the coverage range of the cell, through negotiation in the protocol or standard. In this way, the user device can still obtain the range of application of all TACs broadcast by the base station device, thereby improving the efficiency of receiving information.

An embodiment of the present disclosure provides a method for determining tracking area codes, and the method is applied to a user device. The method may be executed independently, or may be executed in combination with any other embodiment of the embodiments of the present disclosure. The method includes:

receiving the tracking area codes from a base station device;

in response to receiving only one tracking area code from the base station device and receiving no indication information of the tracking area codes from the base station device, determining that the range of application of the one tracking area code corresponds to the coverage range of a cell;

determining a tracking area code corresponding to the user device based on the tracking area codes, the range of application of the tracking area codes, and location information of the user device.

In an embodiment, the user device receives one TAC, but does not receive indication information of the TAC. The base station device and the user device negotiate that, in the protocol or standard, the range of application of the one TAC in this case is a coverage range of the cell. The user device determines the TAC corresponding to the user device based on the received TAC, the determined range of application and the location of the user device.

Through the method in this embodiment, in a case of receiving one TAC, the user device can obtain the range of application of the one TAC without receiving any indication information, which improves the efficiency of receiving information.

Figure 8:
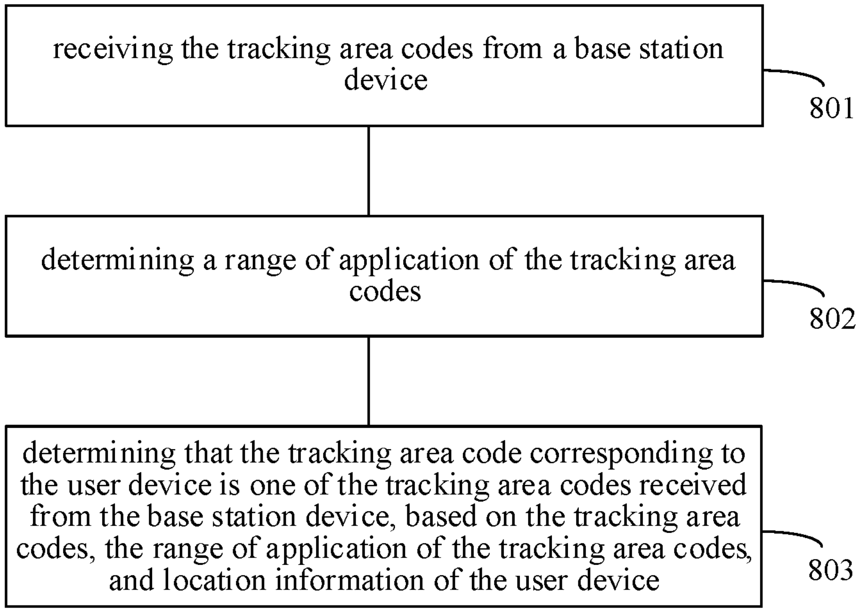
FIG. 8 is a flow chart showing a method for determining tracking area codes according to an example embodiment.

An embodiment of the present disclosure provides a method for determining tracking area codes, and the method is applied to a user device. The method may be executed independently, or may be executed in combination with any other embodiment of the embodiments of the present disclosure. FIG. 8 is a flow chart of a method for determining tracking area codes according to an example embodiment. As shown in FIG. 8, the method includes:

step 801, receiving the tracking area codes from a base station device;

step 802, determining a range of application of the tracking area codes; and step 803, determining that the tracking area code corresponding to the user device is one of the tracking area codes received from the base station device, based on the tracking area codes, the range of application of the tracking area codes, and location information of the user device.

In an embodiment, when the user device enters the cell through cell reselection, it receives three TACs, i.e., TAC1, TAC2, and TAC3, from the base station device in the cell. The user device determines that the range of application of TAC1 is AREA1, and the range of application of TAC2 is AREA2, the range of application of TAC3 is AREA3. The user device obtains its own location information, and determines that the current location of the user device is within the range of AREA1, and the user device determines that its corresponding TAC is the TAC1 corresponding to AREA1, i.e., one of the three TACs received from the base station device.

In an embodiment, when the user device is powered on in the cell, it receives three TACs, i.e., TAC1, TAC2, and TAC3, from the base station device in the cell. The user device determines that the range of application of TAC1 is AREA1, and the range of application of TAC2 is AREA2, the range of application of TAC3 is AREA3. The user device obtains its own location information, and determines that the current location of the user device is within the range of AREA1, and the user device determines that its corresponding TAC is the TAC1 corresponding to AREA1, i.e., one of the three TACs received from the base station device.

In this embodiment, when the user device enters the cell through cell reselection or is powered on in the cell, the corresponding TAC is one of the TACs received from the base station device in the cell.

Figure 9:
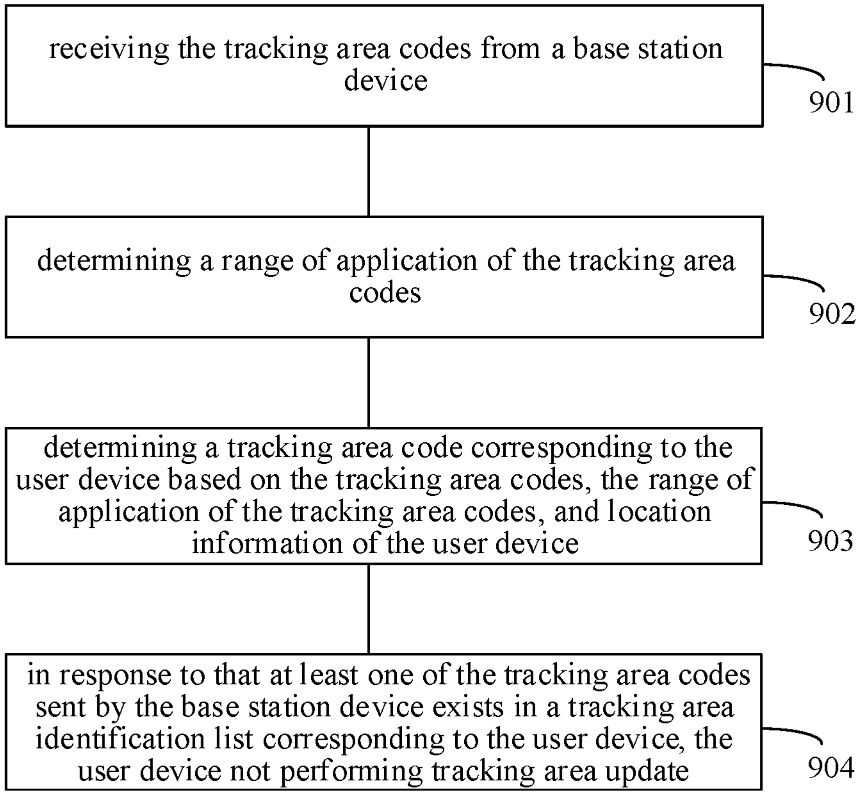
FIG. 9 is a flow chart showing a method for determining tracking area codes according to an example embodiment.

An embodiment of the present disclosure provides a method for determining tracking area codes, and the method is applied to a user device. The method may be executed independently, or may be executed in combination with any other embodiment of the embodiments of the present disclosure. FIG. 9 is a flow chart of a method for determining tracking area codes according to an example embodiment. As shown in FIG. 9, the method includes:

step 901, receiving the tracking area codes from a base station device;

step 902, determining a range of application of the tracking area codes; and step 903, determining a tracking area code corresponding to the user device based on the tracking area codes, the range of application of the tracking area codes, and location information of the user device;

step 904, in response to that at least one of the tracking area codes sent by the base station device exists in a tracking area identification list corresponding to the user device, the user device not performing tracking area update.

In an embodiment, the user device moves from cell 1 to cell 2, and receives three TACs, i.e., TAC1, TAC2, and TAC3, from the base station device of cell 2. The user device determines that the range of application of TAC1 is AREA1, and the range of application of TAC2 is AREA2, the range of application of TAC3 is AREA3. The user device obtains its own location information, and determines that the current location of the user device is within the range of AREA1, so that the user device determines that its corresponding TAC is the TAC1 corresponding to AREA1. The user device determines that the TAC1 exists in the corresponding TA1 list, and TAU/RAU is not executed.

In an embodiment, the user device is powered on at a certain location in cell 2, and receives three TACs, i.e., TAC1, TAC2, and TAC3, from the base station device of cell 2. The user device determines that the range of application of TAC1 is AREA1, and the range of application of TAC2 is AREA2, the range of application of TAC3 is AREA3. The user device obtains its own location information, and determines that the current location of the user device is within the range of AREA1, so that the user device determines that its corresponding TAC is the TAC1 corresponding to AREA1. The user device determines that the TAC1 does not exist in the corresponding TAI list, but TAC2 and/or TAC3 exist in its corresponding TAI list, and TAU/RAU is not executed.

In this embodiment, if the TAC corresponding to the user device exists in its corresponding TAI list, or the TAC corresponding to the user device does not exist in its corresponding TAI list, but at least one of the TACs received by the user device from the base station device exists in its corresponding TAI list, the user device does not execute TAU/RAU, thereby preventing the user device from executing unnecessary TAU/RAU, thereby reducing signaling overhead and energy consumption.

Figure 10:
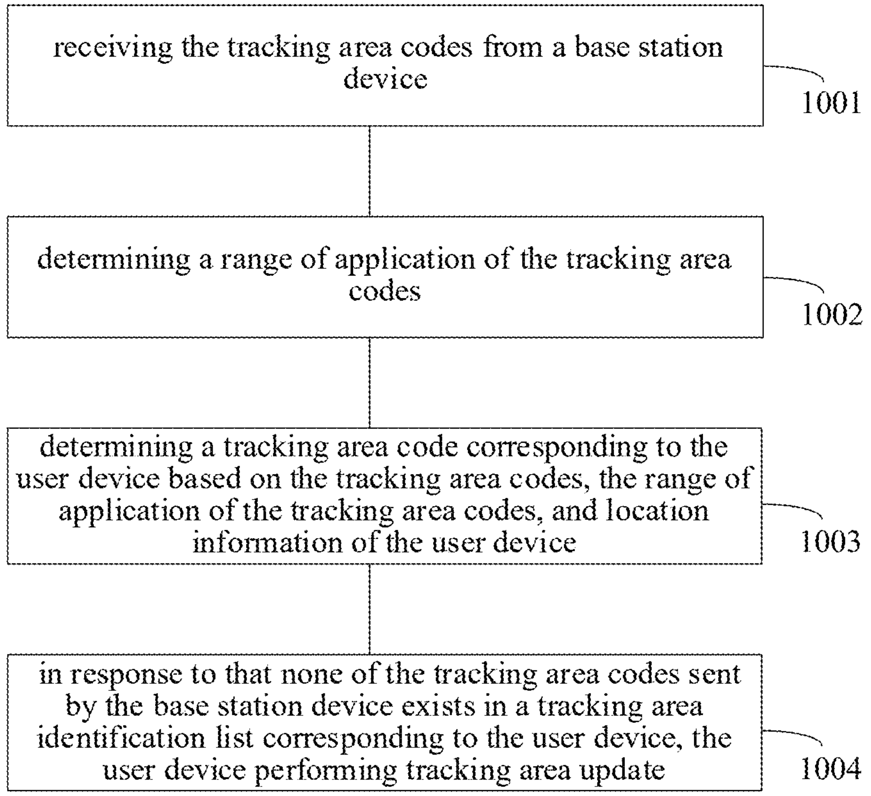
FIG. 10 is a flow chart showing a method for determining tracking area codes according to an example embodiment.

An embodiment of the present disclosure provides a method for determining tracking area codes, and the method is applied to a user device. The method may be executed independently, or may be executed in combination with any other embodiment of the embodiments of the present disclosure. FIG. 10 is a flow chart of a method for determining tracking area codes according to an example embodiment. As shown in FIG. 10, the method includes:

step 1001, receiving the tracking area codes from a base station device;

step 1002, determining a range of application of the tracking area codes;

step 1003, determining a tracking area code corresponding to the user device based on the tracking area codes, the range of application of the tracking area codes, and location information of the user device;

step 1004, in response to that none of the tracking area codes sent by the base station device exists in a tracking area identification list corresponding to the user device, the user device performing tracking area update.

In an embodiment, the user device moves from cell 1 to cell 2, and receives three TACs, i.e., TAC1, TAC2, and TAC3, from the base station device of cell 2. The user device determines that the range of application of TAC1 is AREA1, and the range of application of TAC2 is AREA2, the range of application of TAC3 is AREA3. The user device obtains its own location information, and determines that the current location of the user device is within the range of AREA1, so that the user device determines that its corresponding TAC is the TAC1 corresponding to AREA1. The user device determines that the TAC1 does not exist in the corresponding TAI list, and neither TAC2 nor TAC3 exists in its corresponding TAI list, and TAU/RAU is executed.

In this embodiment, only when none of the TACs received by the user device from the base station device exists in its corresponding TAI list, the user device performs TAU/RAU, thereby preventing the user device from executing unnecessary TAU/RAU, thereby reducing signaling overhead and energy consumption.

The following will be described in detail through specific embodiments.

Embodiment One

Figure 11:
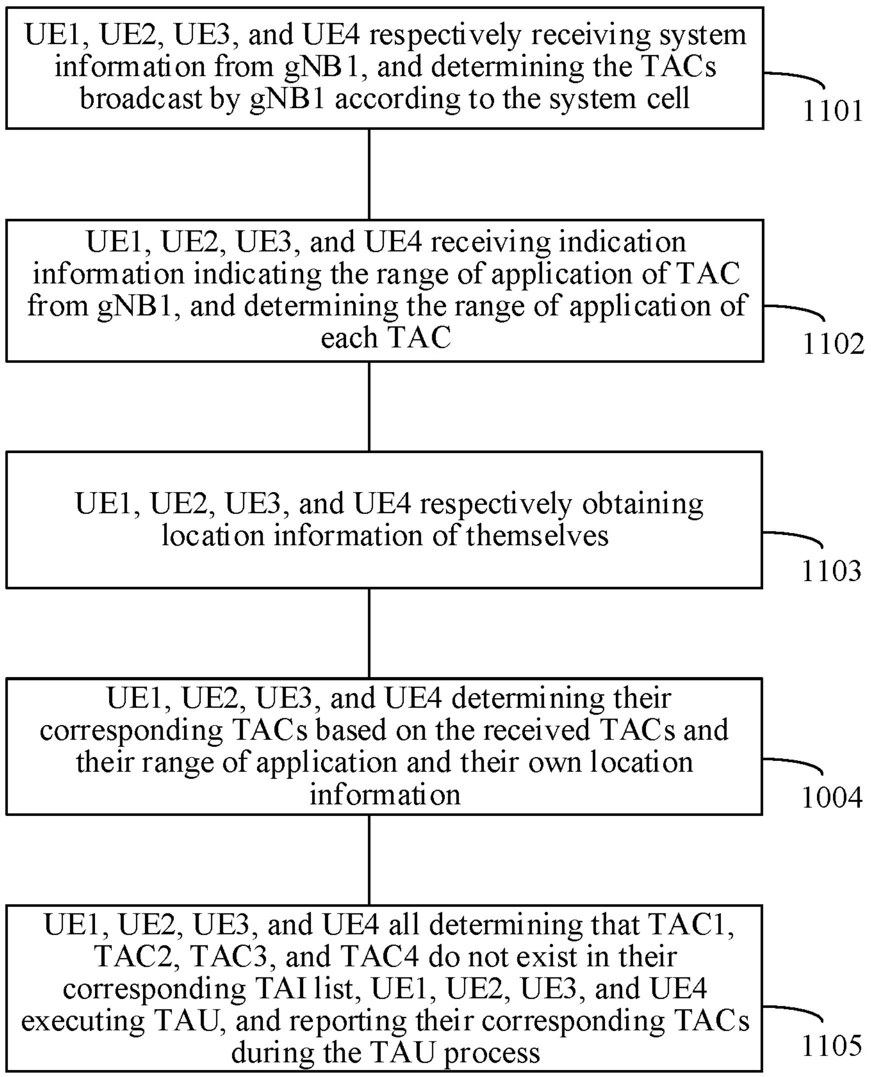
FIG. 11 is a flow chart showing a method for determining whether to execute TAU/RAU according to an example embodiment.

Referring to FIG. 11, FIG. 11 shows a flow chart of a method for the user device to determine whether to execute TAU/RAU. In this embodiment, four user devices, i.e., UE1, UE2, UE3, and UE4, enter the base station device, i.e., the cell where gNB1 is located, from different locations through cell reselection. The gNB1 broadcasts four TACs: TAC1, TAC2, TAC3, and TAC4. The method of this embodiment includes the following steps.

Step 1101, UE1, UE2, UE3, and UE4 respectively receive system information from gNB1, and determine that the TACs broadcast by gNB1 according to the system cell are TAC1, TAC2, TAC3, and TAC4.

Step 1102, UE1, UE2, UE3, and UE4 receive indication information indicating the range of application of TAC from gNB1, and determine that the range of application of TAC1 is AREA1, the range of application of TAC2 is AREA2, the range of application of TAC3 is AREA3, and the range of application of TAC4 is AREA4.

Step 1103, UE1, UE2, UE3, and UE4 respectively obtain location information of themselves. UE1 is located in AREA1, UE2 is located in AREA2, UE3 is located in AREA3, and UE4 is located in AREA4.

Step 1104, UE1, UE2, UE3, and UE4 determine their corresponding TACs based on the received TACs and their range of application and their own location information. The TAC corresponding to UE1 is TAC1, the TAC corresponding to UE2 is TAC2, the TAC corresponding to UE3 is TAC3, and the TAC corresponding to UE4 is TAC4.

Step 1105, UE1, UE2, UE3, and UE4 all determine that TAC1, TAC2, TAC3, and TAC4 do not exist in their corresponding TAI list, UE1, UE2, UE3, and UE4 execute TAU, and report their corresponding TACs during the TAU process. UE1 reports TAC1, UE2 reports TAC2, UE3 reports TAC3, and UE4 reports TAC4.

Embodiment Two

Figure 12:
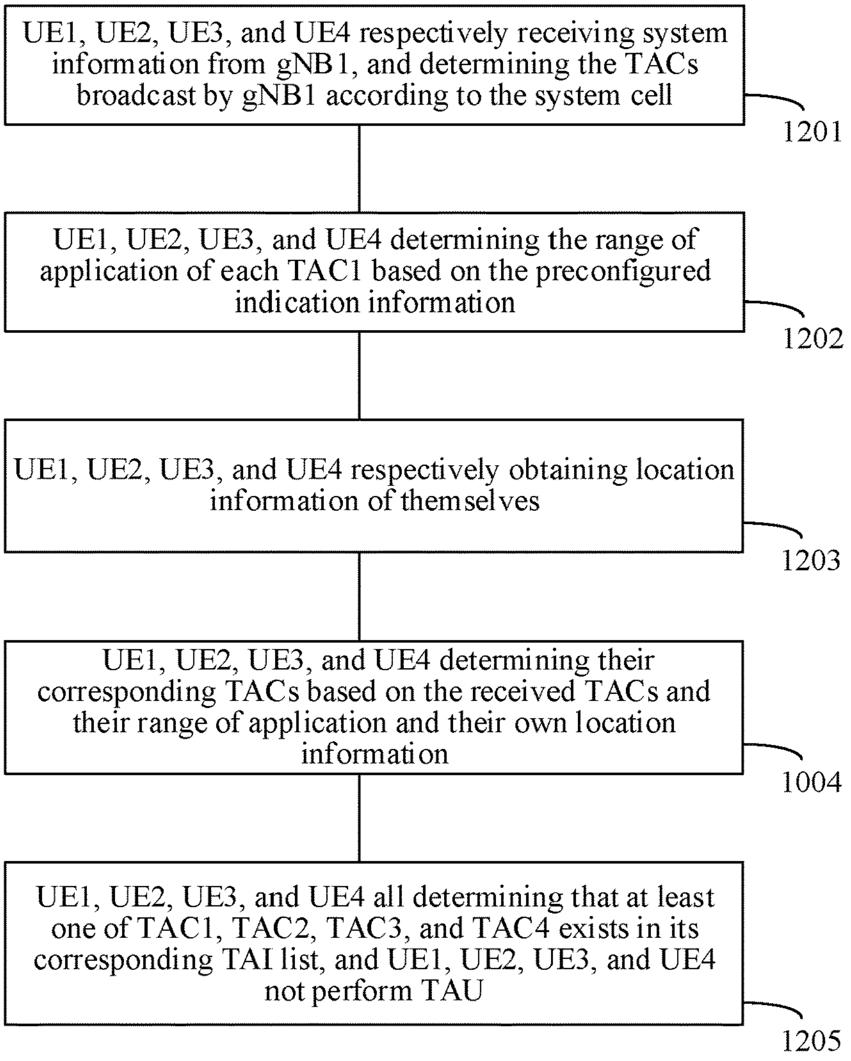
FIG. 12 is a flow chart showing a method for determining whether to execute TAU/RAU according to an example embodiment.

Referring to FIG. 12, FIG. 12 shows a flow chart of a method for the user device to determine whether to execute TAU/RAU. In this embodiment, four user devices, i.e., UE1, UE2, UE3, and UE4 are powered on at different locations of the cell where gNB1 is located, and establish a connection with gNB1 through cell selection. The gNB1 broadcasts four TACs: TAC1, TAC2, TAC3, and TAC4. The method of this embodiment includes the following steps.

Step 1201, UE1, UE2, UE3, and UE4 respectively receive system information from gNB1, and determine that the TACs broadcast by gNB1 according to the system cell are TAC1, TAC2, TAC3, and TAC4.

Step 1202, UE1, UE2, UE3, and UE4 determine that the range of application of TAC1 is AREA1, the range of application of TAC2 is AREA2, the range of application of TAC3 is AREA3, and the range of application of TAC4 is AREA4, based on the preconfigured indication information.

Step 1203, UE1, UE2, UE3, and UE4 respectively obtain location information of themselves. UE1 is located in AREA1, UE2 is located in AREA2, UE3 is located in AREA3, and UE4 is located in AREA4.

Step 1204, UE1, UE2, UE3, and UE4 determine their corresponding TACs based on the received TACs and their range of application and their own location information. The TAC corresponding to UE1 is TAC1, the TAC corresponding to UE2 is TAC2, the TAC corresponding to UE3 is TAC3, and the TAC corresponding to UE4 is TAC4.

Step 1205, UE1, UE2, UE3, and UE4 all determine that at least one of TAC1, TAC2, TAC3, and TAC4 exists in its corresponding TAI list, and UE1, UE2, UE3, and UE4 do not perform TAU.

Figure 13:
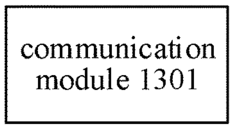
FIG. 13 is a block diagram of an apparatus for sending tracking area codes according to an example embodiment.

An embodiment of the present disclosure provides an apparatus for sending tracking area codes, and the apparatus is applied to a base station device. Referring to FIG. 13, the apparatus includes:

a communication module 1301, configured to send indication information of the tracking area codes, wherein the indication information is used to indicate a range of application of at least one tracking area code.

In some embodiments, the apparatus for sending tracking area codes shown in FIG. 13 may further include a processing module, and the processing module may be used to execute the steps of any methods for sending tracking area codes above.

Figure 14:
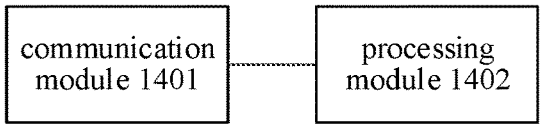
FIG. 14 is a block diagram of an apparatus for determining tracking area codes according to an example embodiment.

An embodiment of the present disclosure provides an apparatus for determining tracking area codes, applied to a user device. Referring to FIG. 14, the apparatus includes:

a communication module 1401, configured to receive tracking area codes from a base station device;

a processing module 1402, configured to determine a range of application of the tracking area codes; and further configured to determine a tracking area code corresponding to the user device based on the tracking area codes, the range of application of the tracking area codes, and location information of the user device.

In some embodiments, as for the apparatus for determining tracking area codes shown in FIG. 14, its processing module may be used to execute the steps of any methods for determining tracking area codes above.

An embodiment of the present disclosure provides a network side device, including:

a processor; and a memory for storing instructions executable by the processor;

wherein, the processor is configured to execute the executable instructions in the memory, to implement steps of the above methods for sending tracking area codes.

An embodiment of the present disclosure provides a mobile terminal, including:

a processor; and a memory for storing instructions executable by the processor;

wherein, the processor is configured to execute the executable instructions in the memory, to implement steps of methods for determining tracking area codes.

An embodiment of the present disclosure provides a non-transitory computer-readable storage medium, having executable instructions stored thereon, wherein the executable instructions implement steps of methods for sending tracking area codes or methods for determining tracking area codes described above, when executed by a processor.

Figure 15:
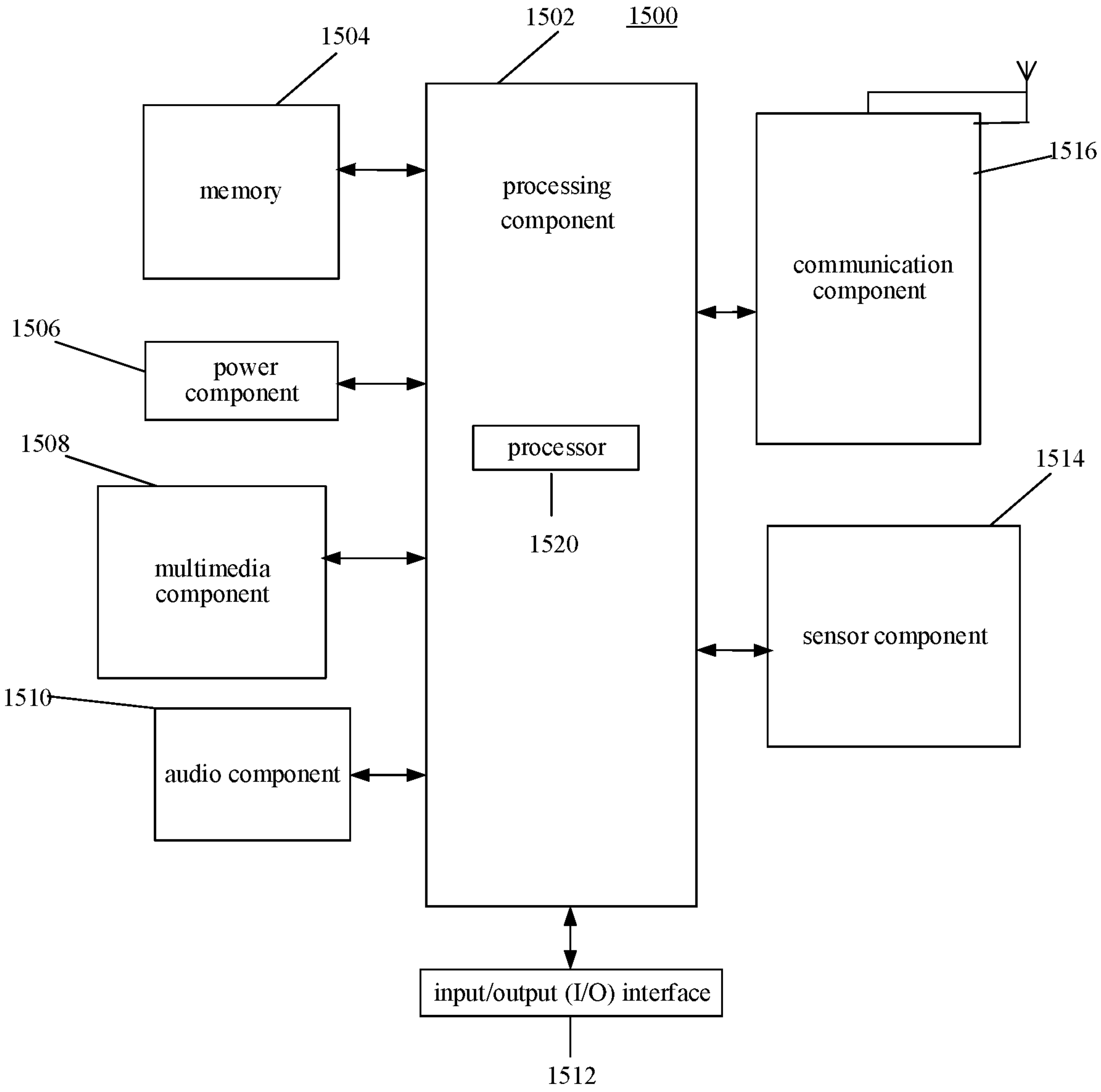
FIG. 15 is a structural diagram of an apparatus for determining tracking area codes according to an example embodiment.

FIG. 15 is a block diagram of an apparatus 1500 for determining tracking area codes according to an example embodiment. For example, the apparatus 1500 may be a mobile phone, a computer, a digital broadcasting terminal, a messaging device, a gaming console, a tablet device, a medical device, a fitness device, a personal digital assistant, etc.

Referring to FIG. 15, the apparatus 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls the overall operations of the apparatus 1500, such as the operations associated with display, telephone calls, data communications, camera operations, and recording operations. The processing component 1502 can include one or more processors 1520 to execute instructions to perform all or part of the steps in the above methods. Moreover, the processing component 1502 can include one or more modules to facilitate the interaction between the processing component 1502 and other components. For example, the processing component 1502 can include a multimedia module to facilitate the interaction between the multimedia component 1508 and the processing component 1502.

The memory 1504 is configured to store various types of data to support the operation of the apparatus 1500. Examples of such data include instructions for any application or method operated on the apparatus 1500, such as the contact data, the phone book data, messages, pictures, videos, and the like. The memory 1504 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the apparatus 1500. The power component 1506 can include a power management system, one or more power sources, and other components associated with generation, management, and distribution of power for the apparatus 1500.

The multimedia component 1508 includes a screen providing an output interface between the apparatus 1500 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes and gestures on the touch panel. The touch sensors may not only sense the boundaries of the touch or swipe action, but also detect the duration and pressure associated with the touch or swipe action. In some embodiments, the multimedia component 1508 includes a front camera and/or a rear camera. When the apparatus 1500 is in an operation mode, such as a photographing mode or a video mode, the front camera and/or the rear camera can receive external multimedia data. Each of the front camera and the rear camera may be a fixed optical lens system or have focus and optical zoom capability.

The audio component 1510 is configured to output and/or input an audio signal. For example, the audio component 1510 includes a microphone (MIC) configured to receive an external audio signal when the apparatus 1500 is in an operation mode, such as a call mode, a recording mode, and a voice recognition mode. The received audio signal may be further stored in the memory 1504 or sent via the communication component 1516. In some embodiments, the audio component 1510 also includes a speaker for outputting the audio signal.

The I/O interface 1512 provides an interface between the processing component 1502 and peripheral interface modules, such as a keyboard, a click wheel, buttons, and the like. These buttons may include, but not limited to, a home button, a volume button, a starting button, and a locking button.

The sensor component 1514 includes one or more sensors for providing state assessments of various aspects of the apparatus 1500. For example, the sensor component 1514 can detect an open/closed state of the apparatus 1500, relative positioning of components, such as the display and the keypad of the apparatus 1500. The sensor component 1514 can also detect a change in position of one component of the apparatus 1500 or the apparatus 1500, the presence or absence of user contact with the apparatus 1500, an orientation, or an acceleration/deceleration of the apparatus 1500, and a change in temperature of the apparatus 1500. The sensor component 1514 can also include a proximity sensor configured to detect the presence of nearby objects without any physical contact. The sensor component 1514 can also include a light sensor, such as a CMOS or CCD image sensor, configured to use in imaging applications. In some embodiments, the sensor component 1514 can also include an accelerometer sensor, a gyroscope sensor, a magnetic sensor, a pressure sensor, or a temperature sensor.

The communication component 1516 is configured to facilitate communication between the apparatus 1500 and other devices by wired or wireless manners. The apparatus 1500 can access a wireless network based on a communication standard, such as Wi-Fi, 2G or 3G, or a combination thereof. In an example embodiment, the communication component 1516 receives broadcast signals or broadcast associated information from an external broadcast management system via a broadcast channel. In an example embodiment, the communication component 1516 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example embodiment, the apparatus 1500 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the methods described above.

In an example embodiment, there is also provided a non-transitory computer-readable storage medium including instructions, such as a memory 1504 including instructions executable by the processor 1520 of the apparatus 1500 to perform the above methods. For example, the non-transitory computer readable storage medium may be a ROM, a random access memory (RAM), a CD-ROM, a magnetic tape, a floppy disc, and an optical data storage device, or the like.

Figure 16:
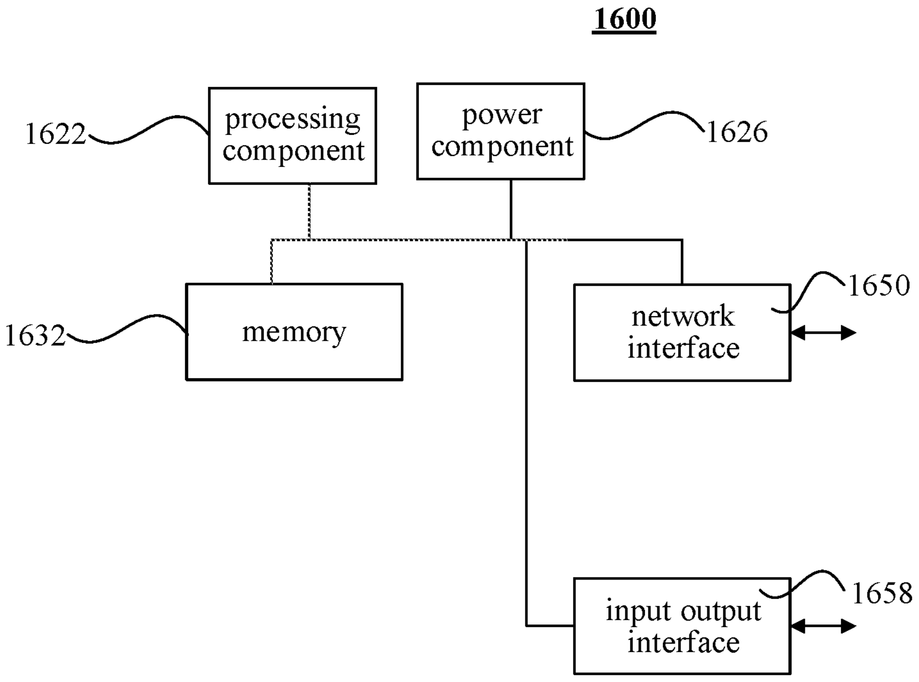
FIG. 16 is a structural diagram of an apparatus for sending tracking area codes according to an example embodiment.

FIG. 16 is a block diagram of an apparatus 1600 for sending tracking area codes according to an example embodiment. For example, apparatus 1600 may be provided as a base station. Referring to FIG. 16, the apparatus 1600 includes a processing component 1622, which further includes one or more processors, and a memory resource represented by memory 1632 for storing instructions executable by the processing component 1622, such as application programs. The application programs stored in memory 1632 may include one or more modules each corresponding to a set of instructions. In addition, the processing component 1622 is configured to execute instructions to perform the above methods.

The apparatus 1600 may also include a power component 1626 configured to perform power management of the apparatus 1600, a wired or wireless network interface 1650 is configured to connect the apparatus 1600 to the network, and an input output (I/O) interface 1658. The apparatus 1600 can operate an operating system stored in the memory 1632, such as Windows Server™, Mac OS X™, Unix™, Linux™, FreeBSD™ or the like.

Other implementations of embodiments of the present disclosure will be apparent to those skilled in the art from consideration of the specification and practice of the present disclosure disclosed herein. The present application is intended to cover any variations, uses, or adaptations of embodiments of the present disclosure, which are in accordance with the general principles of embodiments of the present disclosure and include common general knowledge or conventional technical means in the art that are not disclosed in embodiments of the present disclosure. The specification and embodiments are illustrative only, and the real scope and spirit of embodiments of the present disclosure is defined by the appended claims.

It should be understood that embodiments of the present disclosure is not limited to the precise structures that have been described above and shown in the drawings, and various modifications and changes can be made without departing from the scope thereof. The scope of embodiments of the present disclosure is limited only by the appended claims.

INDUSTRIAL APPLICABILITY

The base station device sends indication information of the tracking area codes, the indication information is used to indicate a range of application of at least one tracking area code. The user device receives the tracking area codes from a base station device, determines a range of application of the received tracking area codes, and then determines a tracking area code corresponding to the user device based on the tracking area codes, the range of application of the tracking area codes, and location information of the user device. By adopting the above method, the user device can accurately determine the corresponding TAC, and achieves that user devices in the same cell coverage range can use different TACs. In addition, after the user device reports the obtained tracking area codes to the network, the network can determine a more precise location of the user device, for example, determine that the user device is located in a certain area within the coverage range of the cell.

What is claimed is:

1. A method for sending tracking area codes, applied to a base station device, comprising:

broadcasting the tracking area codes;

sending indication information of the broadcasted tracking area codes, wherein the indication information is used to indicate a range of application of at least one tracking area code of the broadcasted tracking area codes; and determining that the range of application of the at least one tracking area code corresponds to a partial coverage range of a cell, in response to determining that no indication information corresponds to the tracking area codes broadcasted by the base station device, wherein the partial coverage range of the cell is a coverage range of the cell after removing a range of application of other tracking area codes from the coverage range of the cell, and the coverage range of the cell is a coverage range of the cell corresponding to the base station device broadcasting the tracking area codes.

2. The method according to claim 1, wherein the range of application of the at least one tracking area code is smaller than or equal to the coverage range of the cell.

3. The method according to claim 2, wherein the indication information comprises:

information used for indicating that the range of application of the at least one tracking area code corresponds to the coverage range of the cell.

4. The method according to claim 1, wherein the sending the indication information of the broadcasted tracking area codes comprises:

sending the indication information to a user device through a setting field in at least one of a radio resource control message or a system message.

5. The method according to claim 1, wherein the indication information comprises:

information used for indicating geographic location coordinates of the range of application of the at least one tracking area code.

6. A method for determining tracking area codes, applied to a user device, comprising:

receiving the tracking area codes from a base station device;

determining a range of application of the received tracking area codes; and determining a tracking area code corresponding to the user device based on the received tracking area codes, the range of application of the received tracking area codes, and location information of the user device, wherein determining the range of application of the received tracking area codes comprises:

receiving indication information of the received tracking area codes from the base station device, wherein the indication information is used to indicate a range of application of at least one tracking area code; and determining that the range of application of the at least one tracking area code without corresponding indication information corresponds to a partial coverage range of a cell, in response to determining that no indication information corresponds to the tracking area codes received from the base station device, wherein the partial coverage range of the cell is a coverage range of the cell after removing a range of application of other tracking area codes from the coverage range of the cell, and the coverage range of the cell is a coverage range of the cell corresponding to the base station device broadcasting the tracking area codes.

7. The method according to claim 6, wherein the determining the range of application of the received tracking area codes comprises:

acquiring indication information of the received tracking area codes preconfigured on the user device, wherein the indication information is used to indicate the range of application of the at least one tracking area code; and determining the range of application of the received tracking area codes based on the indication information.

8. The method according to claim 7, wherein the indication information comprises:

information used for indicating geographic location coordinates of the range of application of the at least one tracking area code.

9. The method according to claim 6, wherein the range of application of the at least one tracking area code is smaller than or equal to the coverage range of the cell.

10. The method according to claim 9, wherein, in response to receiving only one tracking area code from the base station device and receiving no indication information of the received tracking area codes from the base station device, determining the range of application of the received tracking area codes comprises:

determining that the range of application of the only one tracking area code corresponds to the coverage range of the cell.

11. The method according to claim 6, wherein the receiving the indication information of the received tracking area codes from the base station device comprises:

receiving the indication information from the base station device through a setting field in at least one of a radio resource control message or a system message.

12. The method according to claim 6, wherein the determining the range of application of the received tracking area codes comprises:

in response to determining that the indication information of the received tracking area codes is received from the base station device and the user device is preconfigured with the indication information of the received tracking area codes, determining the range of application of the received tracking area codes based on the indication information received from the base station device.

13. The method according to claim 6, wherein the indication information comprises:

information used for indicating that the range of application of the at least one tracking area code corresponds to the coverage range of the cell.

14. The method according to claim 6, wherein the determining the tracking area code corresponding to the user device comprises: determining that the tracking area code corresponding to the user device is one of the tracking area codes received from the base station device.

15. The method according to claim 14, comprising:

in response to determining that at least one of the tracking area codes received from the base station device exists in a tracking area identification list corresponding to the user device, determining that the user device does not perform tracking area update.

16. The method according to claim 14, comprising:

in response to determining that none of the tracking area codes received from the base station device exists in a tracking area identification list corresponding to the user device, determining that the user device performs tracking area update.

17. An apparatus for sending tracking area codes, applied to base station device, comprising:

a processor; and a memory for storing instructions executable by the processor;

wherein, the processor is configured to:

broadcast the tracking area codes;

send indication information of the broadcasted tracking area codes, wherein the indication information is used to indicate a range of application of at least one tracking area code of the broadcasted tracking area codes; and determine that the range of application of the at least one tracking area code corresponds to a partial coverage range of a cell, in response to determining that no indication information corresponds to the tracking area codes broadcasted by the base station device, wherein the partial coverage range of the cell is a coverage range of the cell after removing a range of application of other tracking area codes from the coverage range of the cell, and the coverage range of the cell is a coverage range of the cell corresponding to the base station device broadcasting the tracking area codes.

* * * * *